No. 615,582. Patented Dec. 6, 1898.
A. SNELL.
CUTTING TABLE FOR PLASTIC MATERIAL.
(Application filed May 24, 1898.)

(No Model.) 3 Sheets—Sheet I.

WITNESSES:

INVENTOR
A. Snell.
BY
ATTORNEYS.

No. 615,582. Patented Dec. 6, 1898.
A. SNELL.
CUTTING TABLE FOR PLASTIC MATERIAL.
(Application filed May 24, 1898.)

(No Model.) 3 Sheets—Sheet 2.

WITNESSES:

INVENTOR
A. Snell.
BY
ATTORNEYS.

No. 615,582. Patented Dec. 6, 1898.
A. SNELL.
CUTTING TABLE FOR PLASTIC MATERIAL.
(Application filed May 24, 1898.)
(No Model.) 3 Sheets—Sheet 3.

WITNESSES:

INVENTOR
A. Snell.
BY
ATTORNEYS.

THE NORRIS PETERS CO., PHOTO-LITHO., WASHINGTON, D. C.

UNITED STATES PATENT OFFICE.

ARPHAD SNELL, OF TICE, ILLINOIS.

CUTTING-TABLE FOR PLASTIC MATERIAL.

SPECIFICATION forming part of Letters Patent No. 615,582, dated December 6, 1898.

Application filed May 24, 1898. Serial No. 681,572. (No model.)

*To all whom it may concern:*

Be it known that I, ARPHAD SNELL, of Tice, in the county of Menard and State of Illinois, have invented a new and Improved Cutting-Table for Plastic Material, of which the following is a full, clear, and exact description.

The object of my invention is to provide a machine of simple, durable, and economic construction, adapted for cutting plastic material either tubular or solid in any desired lengths and delivering the material when cut in such manner that the material may be safely carried to a drying ground or oven.

A particular object of the invention is to construct a machine for cutting plastic material in lengths suitable for fence-posts and to so construct the machine that the material may be received directly from the mold and the material cut and delivered from the machine without interrupting the molding process or delivery of the material from the mold.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figures 1, 2:
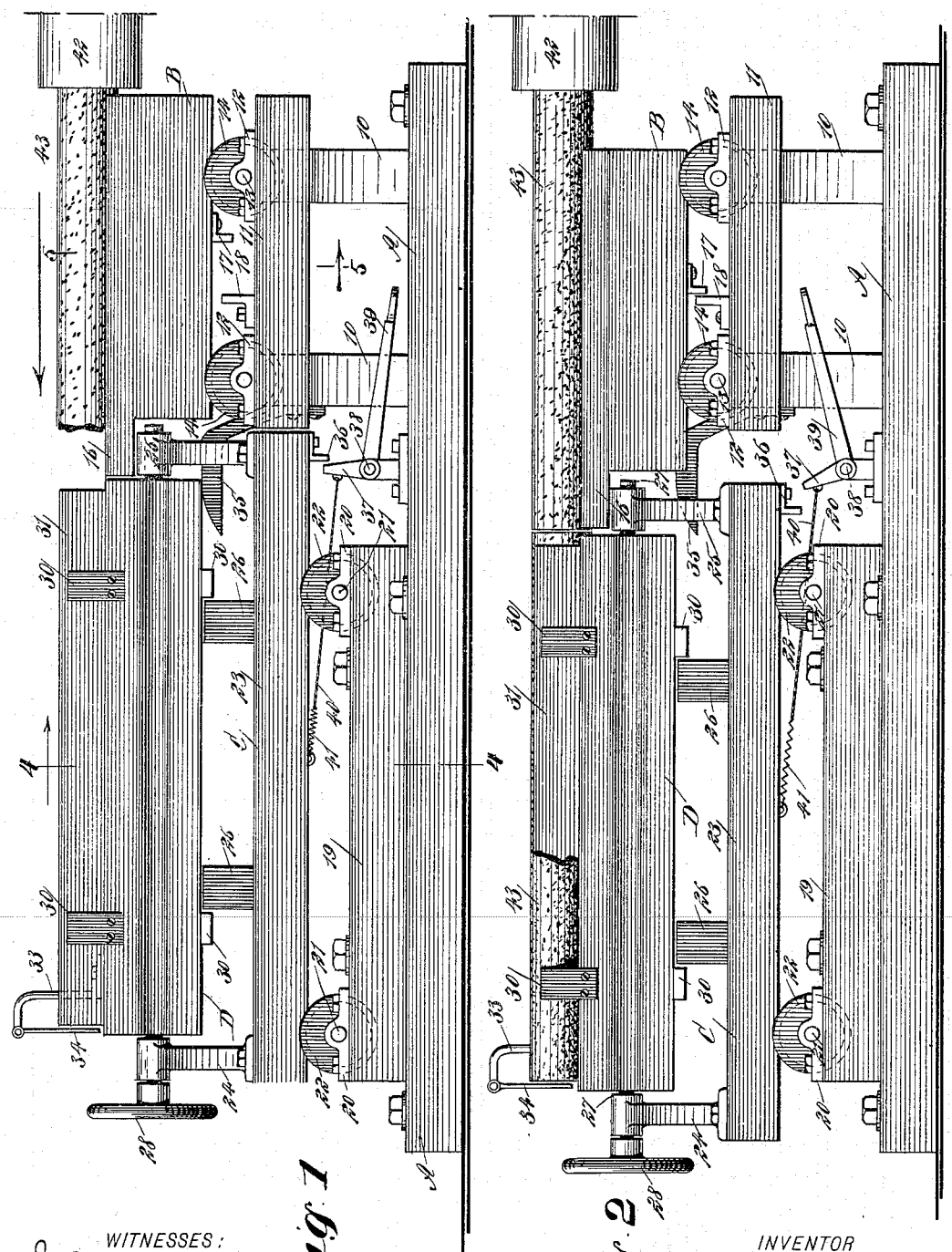
Figure 3:
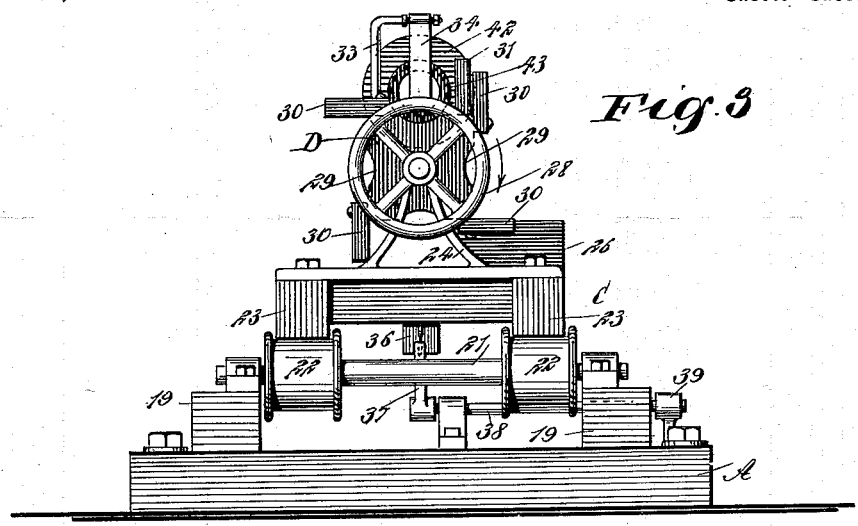
Figure 4:
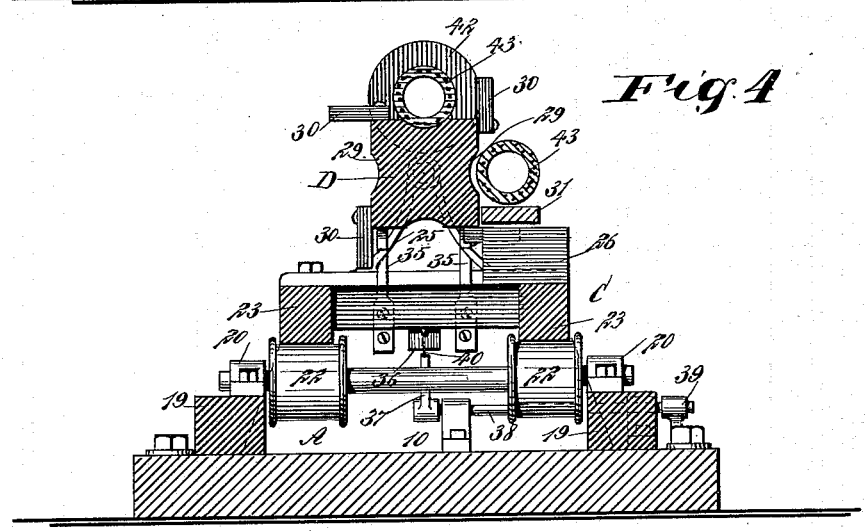
Figure 5:
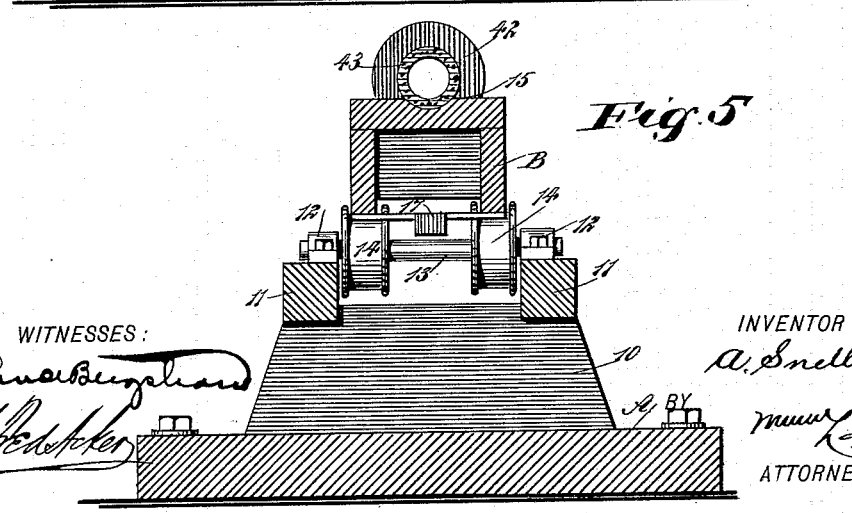
Figure 6:
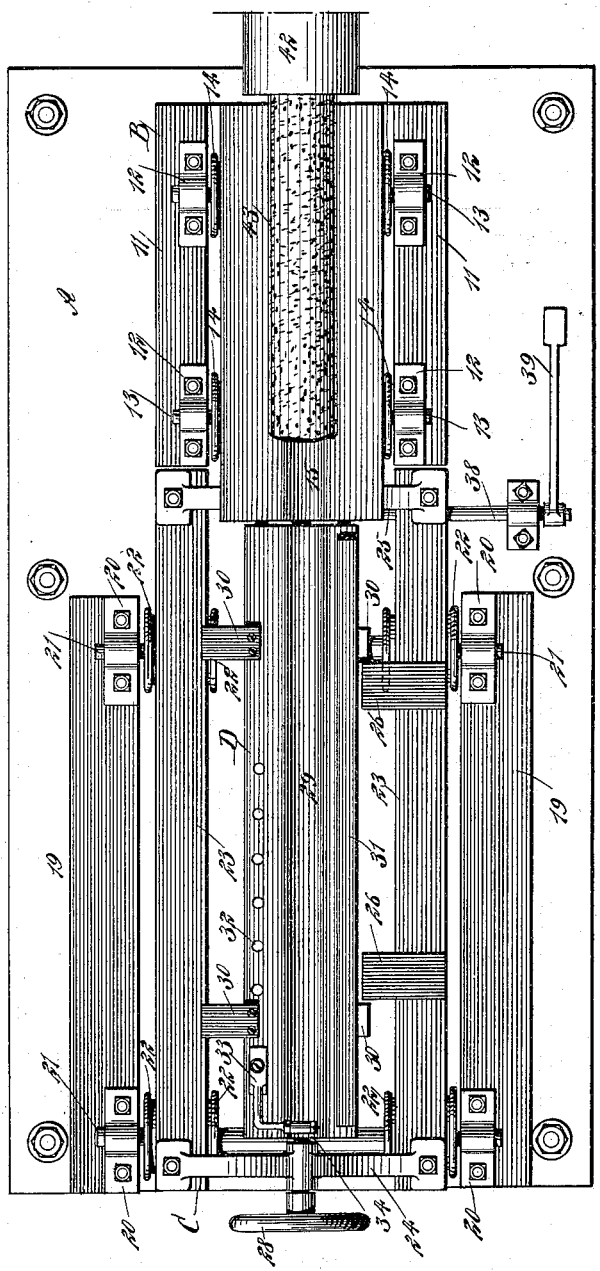
Figure 7:
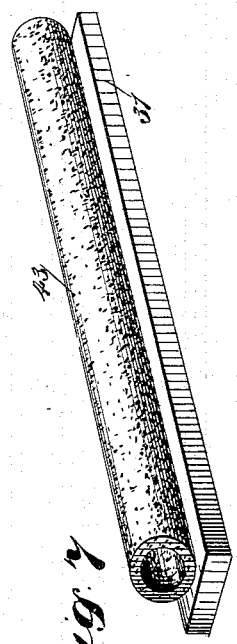

Figure 1 is a side elevation of the improved machine, illustrating the tables of the machine in their initial position or before the plastic material is cut. Fig. 2 is a side elevation of the machine, partially in section, the parts being in the position they occupy at the time the material is cut on the tables. Fig. 3 is an end view of the machine. Fig. 4 is a vertical transverse section taken substantially on the line 4 4 of Fig. 1. Fig. 5 is a vertical transverse section taken on the line 5 5 of Fig. 1. Fig. 6 is a plan view of the machine, the parts thereof being in their initial position; and Fig. 7 is a perspective view of a length of the cut material and the table upon which the material is laid when being delivered from the machine.

A represents a rigid support of any suitable description. At one end of the said support transverse beams 10 are secured, and these beams 10 support longitudinal parallel timbers 11. Upon each side or longitudinal timber 11 preferably two boxes 12 are secured in any approved manner, and in transversely-alining boxes carried by said timbers shafts 13 are mounted, and each shaft is provided usually with two guide-wheels 14, each wheel being provided with a flange at each side. The guide-wheels are adapted to receive between their flanges the side pieces of a table B, the table B being adapted to move longitudinally of the base A. The table B is provided at its inner end with a projection 16, which is a continuation of the top, as shown best in Figs. 1 and 2, and the table is further provided with a longitudinal central groove 15, as shown in Fig. 5. Upon the bottom of the table B, between its center and its outer end, a lug 17 is secured, which is adapted to engage with a lug 18, carried by the timbers 11, and when the two lugs meet, as shown in Fig. 2, the table B cannot move farther in an inwardly direction.

A timber 19 is secured upon the base A longitudinally thereof near each side at the end opposite that at which the table B is located. The timbers 19 are provided with boxes 20, in which shafts 21 are journaled, and the said shafts carry guide rollers or wheels 22, having side flanges, as shown in Fig. 4. The guide wheels or rollers 22 are adapted to receive a carriage C, and the said carriage consists of side beams 23, connected by suitable crossbeams, if desired; but the side beams 23 of the carriage are connected at their ends by hangers, the said hangers being designated as 24 and 25. At one side of the carriage blocks 26 are secured. The carriage C is at the same elevation above the base A as are the timbers 11, that carry the supporting wheels or pulleys for the table B.

A revolving table D is supported by the carriage, and this revolving table may be of any desired cross-sectional shape or of any desired longitudinal shape. Usually, however, the table is polygonal or rectangular in cross-section, and in each of its faces a longitudinal groove 29 is formed, and the uppermost groove on the revolving table will practically constitute a continuation of the groove upon the longitudinally-traveling table B. The trunnions 27 of the revoluble table are journaled in the hangers 24 and 25, and the outer end of the outer trunnion of the revolving table is provided with a hand-wheel 28 or its equivalent, through the medium of which the said revolving table is turned.

Lugs 30 are secured to each face of the revolving table D, the lugs being so attached that they will extend at a right angle beyond the adjacent face of the table. Therefore the lugs at one side of the uppermost face of the revoluble table will extend vertically upward, and the upwardly-extending lugs are at that side of the table adjacent to the blocks 26, and the upwardly-extending lugs are adapted to support a board 31 on the upper face of the revolving table for a purpose to be hereinafter set forth. Apertures 32 are made longitudinally in each face of the revolving table, and any of the apertures in any face is adapted to receive a gage, which preferably consists of an angular upright 33, the upper arm of which extends transversely across the revolving table, and a member 34, pendent from the said upper arm, as illustrated in Figs. 1 and 2. Centering devices are employed for the revolving table. These centering devices may be of any desired construction; but preferably they consist of angular arms 35, the vertical members whereof are attached to the inner face of the inner cross-beam 10, as shown in Figs. 1 and 2, the horizontal members having their free ends inclined at the top, and the said horizontal members are adapted to extend beneath and to an engagement with the under face of the aforesaid revolving table.

A lug 36 is located upon the bottom of the carriage C at what may be termed its "forward" end, and the said lug is adapted to be engaged by a crank-arm 37, which is attached to a shaft 38. The shaft 38 extends transversely along the base A at the delivery side of the machine and is provided at its outer end with a foot-lever 39. The crank-arm 37 is attached, preferably, by a cord 40 and a spring 41 to the central under portion of the carriage C. The delivery end of the mold 42, which forms the plastic column 43, is located adjacent to the outer end of the table B.

In operation the table B is carried as close as possible to the delivery end of the mold 42, and the inner end of the revolving table D is brought as close as possible to the extension end 16 of the table B, and the parts are held in this position by the operator pressing on the foot-lever 39, which will hold the crank-arm 37 against the lug 36 on the carriage C, as shown in Fig. 1. After the molded material has engaged at its outer end with the pendent portion 34 of the gage 33 the table B and carriage C are permitted to travel on their roller-supports until the lugs 17 of the table B engage with the lugs 18 on the support for said table, as shown in Fig. 2, and at that time or while the tables are moving on their supports the column of plastic material is cut by hand or otherwise with a suitable tool at the point where the two tables come together. The board 31 will have been placed in position on the upper face of the revolving table before the cut is made, and as soon as the cut is effected the revolving table is turned by manipulating the wheel 28, and the cut section of the material will be carried upon the board 31, and as the table revolves the board with the cut section of material upon it will be placed upon the blocks 26 on the carriage C, as shown in Fig. 4, and another face of the revolving table will be brought uppermost. Another board 31 is placed in position on the said uppermost face of the revolving table and the two tables are carried in direction of the mold to their initial position. (Illustrated in Fig. 1.)

In the further operation of the device the carriage C may be returned by the downward movement of the foot-lever 39, or it may be returned by a person attending the hand-wheel 28, since the machine requires two attendants—one to cut the material and the other to operate the revolving table.

Having thus described my invention, I claim as new and desire to secure by Letters Patent—

1. In a device for cutting plastic material, a revoluble table having a plurality of faces for receiving the material to be cut, and supports for the cut material, carried by the table and arranged at one side of each face thereof, each support being adapted to receive the cut material when the table is turned and to be delivered therefrom with the cut material thereon, when another face of the table has been brought into an uppermost position to receive a fresh supply of material, as set forth.

2. In a device for handling plastic material, a revoluble table having its faces prepared to receive the material, and guides projected beyond the said faces, adapted to support a board, which board receives the completed material, and means for delivering the said board and material carried thereby when the said table is turned to present another face uppermost, substantially as shown and described.

3. In a machine for manipulating plastic material, a revoluble table adapted to receive the molded material, extensions from the said table projecting beyond its receiving-faces, boards removably supported by said extensions, and a support adapted to receive the removable board and the plastic material delivered thereto, as and for the purpose specified.

4. In a machine for manipulating plastic material, a table having end movement, and a rotating table located adjacent to said table and also having end movement, the rotating table being provided with projections extending beyond its receiving-faces, removable boards supported by the said projections, and means for rotating the said table, substantially as shown and described.

5. In a machine for manipulating plastic material, a table constructed in two sections, one section having end movement and the other section having revoluble movement, the two sections being provided with roller-supports, means for turning the revoluble section, and a supporting device for the plastic material carried by the revoluble section, and removable therefrom, as and for the purpose specified.

6. In a machine for the manipulation of plastic material, the combination, with a table having end movement, of a second table capable of end movement with the first table and also capable of rotary movement, the rotary table being provided with a gage, and means for supporting a carrier for the plastic material delivered thereto from said table, substantially as shown and described.

7. In a machine for the manipulation of plastic material, the combination, with a table constructed in two independent sections, both sections being capable of end movement and one section being also capable of rotary movement, the rotary section being provided with a gage and with means for sustaining a support for the plastic material when said material is delivered from the said rotary section, as and for the purpose specified.

8. In a machine for the manipulation of plastic material, the combination, with a table constructed in two sections, both sections being capable of end movement and one section of rotary movement, the section having rotary movement having multiple faces adapted to receive material delivered thereto, each receiving-face of the rotary section being provided with extensions adapted as supports for boards removable from the rotary section, a carriage for the revoluble section, and supports on the said carriage adapted to receive the supporting-board for the plastic material when the rotary section is turned, substantially as shown and described.

9. In a machine for the manipulation of plastic material, the combination, with a receiving-table constructed in two sections, including a section capable of end movement and a second section capable of end movement and of rotary movement, the rotary section being provided with several surfaces adapted to receive the plastic material, the said faces being also adapted for registry with the receiving-face of the table-section having end movement only, of a carriage for the rotary section, means for turning the rotary section, a gage on the rotary section, and a centering device for the rotary section, substantially as described.

10. In a machine for manipulating plastic material, the combination, with a receiving-table constructed in two sections, one section being capable of end movement only and the other section being capable of end movement and of rotary movement, a gage carried by the rotary section, means for revolving the rotary section, and roller-supports for the two sections of the table, of a centering device for the rotary section, stop devices for the section of the table having end movement only, and means for securing the sections of the table in engagement with each other, as and for the purpose specified.

11. In a machine for manipulating plastic material, the combination, with a receiving-table constructed in two sections, one section being capable of end movement only and the other section being capable of end movement and of rotary movement, a gage carried by the rotary section, means for revolving the rotary section, and roller-supports for the two sections of the table, of a centering device for the rotary section, stop devices for the section of the table having end movement only, means for securing the sections of the table in engagement with each other, supports attached to the rotary section, extending beyond the receiving-faces of the said section at a right angle to said faces, and removable boards engaging with the said supports, as and for the purpose specified.

ARPHAD SNELL.

Witnesses:
J. FRED. ACKER,
EVERARD BOLTON MARSHALL.